US012779742B2

(12) United States Patent
Dunleavy et al.

(10) Patent No.: US 12,779,742 B2
(45) Date of Patent: Nov. 3, 2026

(54) METHOD FOR THE MANUFACTURE OF A SKIN FOR AN AERONAUTICAL ENGINE

(71) Applicant: SAFRAN, Paris (FR)

(72) Inventors: Patrick Dunleavy, Moissy-Cramayel (FR); Marc Da Silva, Moissy-Cramayel (FR); Patrick Henrat, Moissy-Cramayel (FR)

(73) Assignee: SAFRAN, Paris (FR)

( * ) Notice: Subject to any disclaimer, the term of this patent is extended or adjusted under 35 U.S.C. 154(b) by 120 days.

(21) Appl. No.: 18/848,804

(22) PCT Filed: Mar. 13, 2023

(86) PCT No.: PCT/FR2023/050330
§ 371 (c)(1),
(2) Date: Sep. 19, 2024

(87) PCT Pub. No.: WO2023/180648
PCT Pub. Date: Sep. 28, 2023

(65) Prior Publication Data

US 2025/0214284 A1 Jul. 3, 2025

(30) Foreign Application Priority Data

Mar. 22, 2022 (FR) ...................................... 2202543

(51) Int. Cl.
*B29C 35/02* (2006.01)
*B29C 35/04* (2006.01)
(Continued)

(52) U.S. Cl.
CPC ...... *B29C 35/0294* (2013.01); *B29C 35/0805* (2013.01); *B29C 70/34* (2013.01);
(Continued)

(58) Field of Classification Search
CPC .... B29C 2043/3433; B29C 2043/3438; B29C 39/025; B29C 39/12; B29C 41/00;
(Continued)

(56) References Cited

U.S. PATENT DOCUMENTS 10,245,791 B2 4/2019 Kok et al.
10,443,496 B2 * 10/2019 Herrera ................ B32B 27/065
(Continued)

FOREIGN PATENT DOCUMENTS

DE 10129514 A1 12/2002
EP 3221122 A1 9/2017

OTHER PUBLICATIONS

Search Report and Written Opinion issued in International Application No. PCT/FR2023/050330, mailed Sep. 28, 2023.
(Continued)

*Primary Examiner* — Stella K Yi
(74) *Attorney, Agent, or Firm* — Bookoff McAndrews, PLLC

(57) ABSTRACT

Method for the manufacture of at least one skin, in particular of an acoustic panel for an aeronautical engine, including the laying of a thermoplastic material on a surface of a lay-up tooling, via a depositing tool configured to exert a pressure on the thermoplastic material and to heat the latter while it is being laid, wherein the lay-up tooling includes a thermal regulation device configured to locally heat the surface of the lay-up tooling.

9 Claims, 3 Drawing Sheets

(51) Int. Cl.

| | |
|---|---|
| ***B29C 35/08*** | (2006.01) |
| ***B29C 70/34*** | (2006.01) |
| ***B29C 70/38*** | (2006.01) |
| ***B29C 70/54*** | (2006.01) |
| ***B29K 71/00*** | (2006.01) |
| ***B29K 105/08*** | (2006.01) |
| ***B29L 31/00*** | (2006.01) |

(52) U.S. Cl.
CPC .............. *B29C 70/38* (2013.01); *B29C 70/54* (2013.01); *B29C 35/045* (2013.01); *B29C 2035/0811* (2013.01); *B29C 2035/0838* (2013.01); *B29K 2071/00* (2013.01); *B29K 2105/0872* (2013.01); *B29K 2995/0002* (2013.01); *B29L 2031/7504* (2013.01)

(58) Field of Classification Search
CPC ..... B29C 41/22; B29C 43/003; B29C 43/265; B29C 64/124; B29C 64/153; B29C 64/194
See application file for complete search history.

(56) References Cited

U.S. PATENT DOCUMENTS

| | | | | |
|---|---|---|---|---|
| 2017/0100894 | A1* | 4/2017 | Burns | B29C 64/386 |
| 2018/0016981 | A1 | 1/2018 | Herrera et al. | |

OTHER PUBLICATIONS

Search Report issued in French Application No. 2202543, mailed Nov. 3, 2022.

* cited by examiner

[Fig. 1]
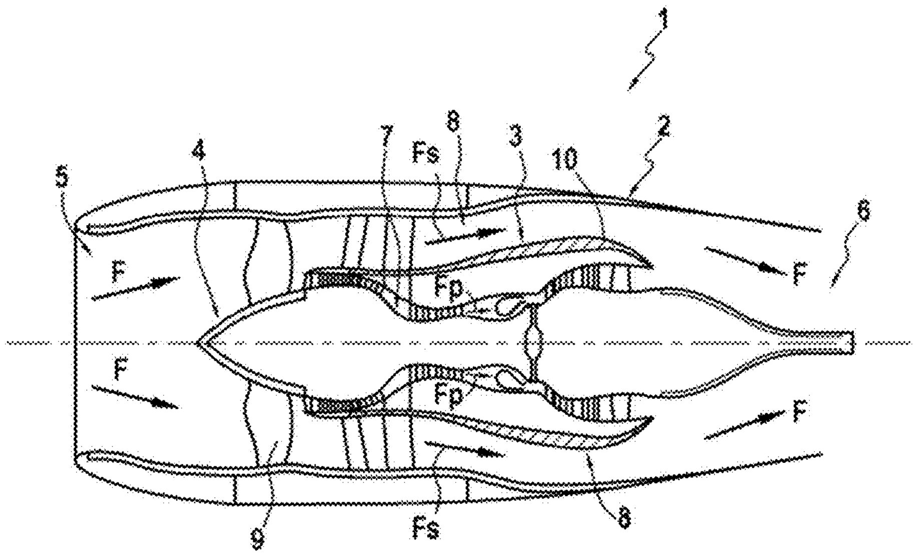
[Fig. 2]
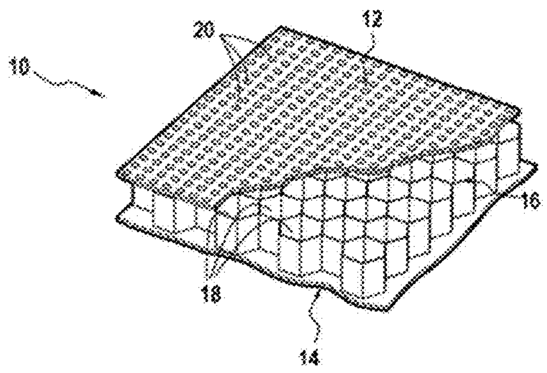

[Fig. 3]
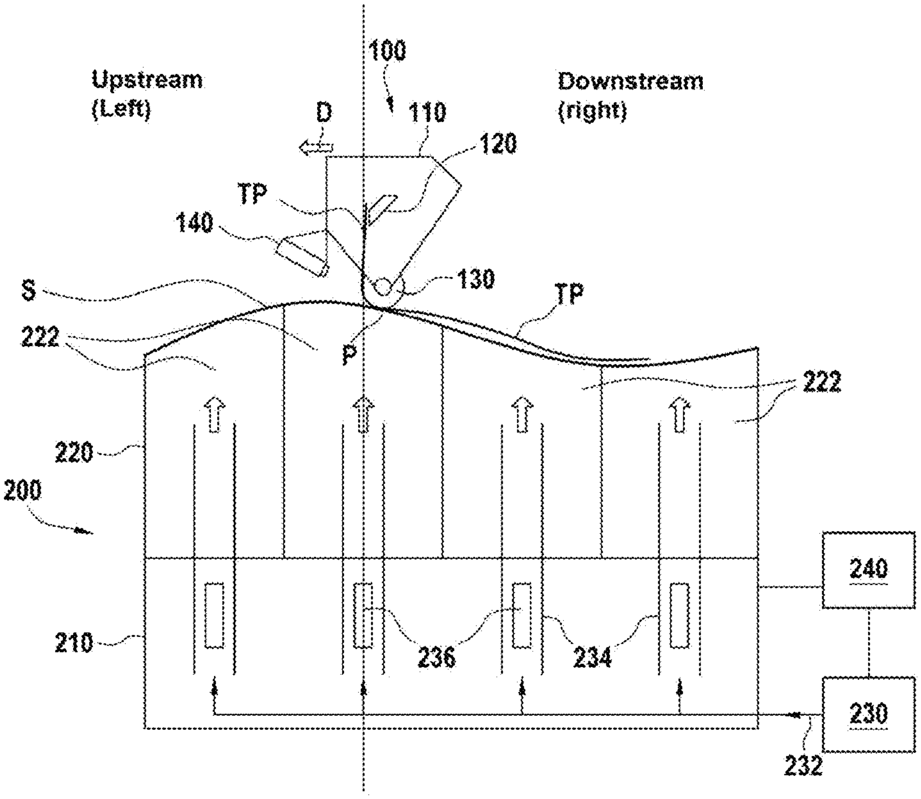
[Fig. 4]
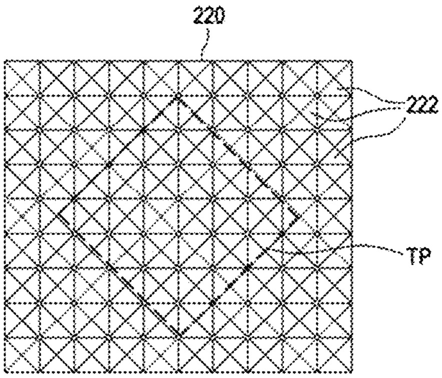

[Fig. 5]
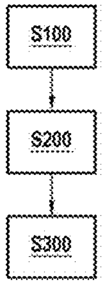

METHOD FOR THE MANUFACTURE OF A SKIN FOR AN AERONAUTICAL ENGINE

CROSS-REFERENCE TO RELATED APPLICATIONS

This is a National Stage Application under 35 U.S.C. § 371 of International Application No. PCT/FR2023/050330, filed Mar. 13, 2023, now published as WO 2023/180648 A1, which claims priority to French Patent Application No. 2202543, filed on Mar. 22, 2022, the entireties of which are incorporated herein by reference.

TECHNICAL FIELD

This disclosure relates to the field of skins used in aeronautical engines, in particular, but not exclusively, in the casings or acoustic panels of these engines. More specifically, this disclosure relates to a method for the manufacture of such a skin, and to a skin obtained by such a method.

PRIOR ART

As is known, the skins used in aeronautical engines, for example in the casings where the acoustic panels present in these engines, are deposited by automated laying of thermosetting matrix composite. More precisely, a skin is laid on a lay-up tooling, more precisely on the surface (or substrate) of said tool. This laying is carried out by depositing tools known per se, such as robots called "AFP", for "automated fiber placement", successively depositing wicks, or pre-impregnated ("prepreg") strips parallel to each other and on several layers, called "plies", or else by "ATL" for "automated tape layer", by depositing pre-impregnated sheets of greater width than the strips deposited in the "AFP" technique. These sheets are deposited one after the other. The skin is then polymerized in an autoclave for several hours.

Currently, composite materials with a thermoplastic matrix are also used and have many advantages over thermosets. In particular, the chemical bonds in a thermoplastic resin are created reversibly. It is sufficient to heat the resin for it to melt and thus be able to reuse it (conversely, a thermosetting resin, once polymerized, can no longer be used, or with difficulty). Thermoplastic materials can therefore be reused "infinitely". They can also be stored at room temperature.

Among the thermoplastic resins known in the aeronautical industry and compatible with the engine environment, the resins called "semi-crystalline" resins are used. Semi-crystalline materials have the advantages of being resistant to chemical agents, fire, and abrasion. They also have better mechanical properties.

However, to obtain the target properties of this material, in particular a desired level of crystallinity, it is necessary to control the thermal cycle of implementation. When laying the skins, the aforementioned depositing tools allow to provide the necessary pressure and the heat necessary for the adhesion of the last ply deposited with the one currently being deposited, but do not allow to control the thermal cycle and therefore the level of crystallinity. For this purpose, the management of the thermal cycle is currently obtained by a second process, via the application of a thermal cycle in an autoclave or oven.

These autoclave and oven consolidation solutions generate high energy consumption and are expensive. In addition, the manufacturing process for these skins is fragmented, which slows down the manufacturing cycle.

There is therefore a need to at least partially overcome the above-mentioned disadvantages.

DISCLOSURE OF THE INVENTION

The present disclosure relates to a method for the manufacture of at least one skin, in particular of an acoustic panel for an aeronautical engine, comprising the laying of a thermoplastic material on a surface of a lay-up tooling, via a depositing tool configured to exert a pressure on the thermoplastic material and to heat the latter while it is being laid, wherein the lay-up tooling comprises a thermal regulation device configured to locally heat the surface of the lay-up tooling.

It is understood that the skin is deposited by laying directly on the lay-up tooling, more precisely on the surface (or substrate) of said tool.

The skin is laid using a depositing tool that may be an "AFP" or "ATL" robot, by successive depositions of reinforcement strips or sheets prepreg (pre-impregnated) with thermoplastic material. The depositing tool may, for example, comprise a deposition head for applying the pressure and heat necessary for the strips to adhere to each other, in particular the last ply deposited with to one currently being deposited.

Moreover, the thermal regulation device of the lay-up tooling allows to locally supply heat to the surface of the lay-up tooling, and therefore to locally heat or cool the thermoplastic material already deposited on said surface. This modulation and this additional supply of heat in a local and targeted manner allow to control the cooling of the thermoplastic material that has just been deposited, and therefore that has just been heated by the depositing tool. More precisely, thanks to the local supply of heat, the temperature gradient during cooling is controlled. The cooling speed of the thermoplastic material that has just been heated by the depositing tool can thus be controlled, in particular by being slower than if the thermoplastic material were immediately exposed to ambient temperature. It is thus understood that the local supply of heat by the thermal regulation device is preferably carried out at a temperature lower than the heat supplied by the depositing tool, and higher than ambient temperature. A local heat supply to the surface of the lay-up tooling before the thermoplastic material is deposited can also allow a gradual temperature rise of said surface before deposition.

The local supply of heat allows in particular to target the areas that need to be heated or cooled more or less quickly, so as to obtain the desired degree of crystallinity depending on the areas of the skin and its thicknesses, which are not necessarily uniform over its entire surface, as they depend on the number of plies.

This method thus allows to control the level of crystallinity of the material, and thus to ensure the material health and good properties of the material, in particular by providing it with good adhesion between the fibers and the matrix of the material without the need for additional thermal cycles in an autoclave with high energy consumption. It is thus possible to limit costs and improve the speed of manufacturing cycles.

In some embodiments, the lay-up tooling comprises a plurality of cells disposed under the surface of said lay-up tooling on which the skin is manufactured, the thermal regulation device being configured to heat each cell individually.

"Cells" means cavities, or compartments, disposed under the surface of the lay-up tooling. By individually heating each of these cells, it is thus possible to locally heat the surface of the lay-up tooling. This allows to preheat certain areas of the surface of the lay-up tooling, just before the thermoplastic material is deposited thereon, so as to control the thermal gradient during heating undergone by the latter, and also to improve the control of the cooling of the thermoplastic material just deposited on this surface during the manufacture of the skin.

In some embodiments, the local heating of the surface of the lay-up tooling is carried out by induction, via a heat transfer fluid or via pulsed air.

Furthermore, when the lay-up tooling comprises a plurality of cells disposed under the surface of the lay-up tooling, each cell can be heated individually by induction, by means of a heat transfer fluid or by pulsed air. In particular, local heating by pulsed air allows to vary significantly the quantity and duration of the application of the heat supply with each ply deposited, which is particularly advantageous given the high thermal insulation capacity of thermoplastic resins. This technique in particular allows a dynamic variation in temperature compatible with automated laying speeds ranging from 0.1 m/min to 60 m/min. Furthermore, heating by pulsed air allows low energy consumption due to its capacity for local dynamic variation in temperature.

In some embodiments, the local heating of the surface of the lay-up tooling is carried out by pulsed air, each cell being supplied with pulsed air via a conduit, each conduit being equipped with a heating element individually controlled by the thermal regulation device.

In some embodiments, the thermal regulation device comprises a control unit configured to synchronize the local heating of the surface of the lay-up tooling with the movement of the depositing tool.

In particular, when the lay-up tooling comprises a plurality of cells disposed under the surface of the lay-up tooling, the control unit can individually control each cell, and in particular each heating element, to provide heat locally according to the position of the depositing tool and its movement. This synchronization allows to further improve the control of the local cooling of the thermoplastic material that has just been deposited and therefore heated by the depositing tool, and thus to further control the degree of crystallinity of the material, consequently improving the material health of the material.

In some embodiments, a deposition surface being defined as the contact surface between the depositing tool and the surface of the lay-up tooling, the depositing tool being configured to heat the surface of the lay-up tooling to a first temperature downstream of the deposition surface, and the thermal regulation device being configured to locally heat the surface of the lay-up tooling upstream of the deposition surface to a second temperature lower than the first temperature, an upstream-downstream direction being defined relative to the direction of movement of the depositing tool relative to the surface of the lay-up tooling.

It is understood that during the manufacture of the skin by laying, the depositing tool moves relative to the surface of the lay-up tooling, and the deposition surface therefore moves accordingly. This deposition surface may in particular be the contact surface between a compacting roller and the surface of the lay-up tooling. Thus, upstream of the deposition surface are located the prepreg strip(s) of thermoplastic material that has just been deposited by the depositing tool during its movement, and downstream of the deposition surface is located the region of the surface of the lay-up tooling, just before said strip(s) is (are) deposited.

Heating this downstream region to the first temperature allows to facilitate the deposition and to improve the adhesion of the strips of thermoplastic material to each other. Moreover, the local heating of the surface of the lay-up tooling, upstream of the deposition surface where the prepreg reinforcement strip of thermoplastic material that has just been deposited by the depositing tool and heated by the latter is located, to the second temperature lower than the first temperature, allows to cool this material while reducing the temperature difference undergone by the latter, and therefore controlling its cooling.

In some embodiments, the thermal regulation device is configured to locally regulate the temperature of the surface of the lay-up tooling by local heating gradients comprised between 30° C./min and 100° C./min.

It is thus possible to locally heat or cool the thermoplastic material by more or less rapid heating ramps, depending on the desired level of crystallinity.

In some embodiments, the thermoplastic material is a polyetheretherketone, a polyetherketoneketone or a polyaryletherketone. These thermoplastic resins called "semi-crystalline" thermoplastic resins have the advantage of being particularly high-performance and compatible with the aeronautical engine environment.

In some embodiments, during the manufacture of the first skin, the tool for depositing successive prepreg reinforcement strips of the thermoplastic material, by means of a compacting roller exerting a pressure on the thermoplastic material while it is being laid.

The depositing tool thus presses on the prepreg strips of thermoplastic material, in the same way as a roll of scotch tape unrolled using a dispenser gun or an unroller, via the compacting roller. This pressure exerted by the compacting roller improves the adhesion of the strips of thermoplastic material to each other, from one layer to another, that is to say from one ply to another.

In some embodiments, the depositing tool heats the thermoplastic material during laying using a laser.

The use of the laser makes it easier to orient the heat source, in particular by directing the laser towards the compacting roller, and therefore towards the strip of thermoplastic material being laid. This targeted supply of heat by the depositing tool allows to improve the adhesion of the strips to each other, in particular between the last ply deposited and the one being laid. Alternatively, the depositing tool can heat the thermoplastic material while it is being laid using a lamp, a torch, or any other suitable means.

The present disclosure also relates to an acoustic panel, comprising a skin obtained by a method according to any one of the preceding embodiments.

The present disclosure also relates to an aeronautical engine comprising an acoustic panel according to the present disclosure, the aeronautical engine being a turbojet engine.

The present disclosure also relates to a method for the manufacture of an acoustic panel for an aeronautical engine, comprising:

- manufacturing a first skin by a method according to any one of the preceding embodiments,
- manufacturing an acoustic complex comprising a plurality of cells, on the first skin, and
- manufacturing a second skin by laying the thermoplastic material on the acoustic complex, by means of the depositing tool.

It is understood that the first skin is deposited by laying directly on the lay-up tooling, more precisely on the surface (or substrate) of said tool, while the second skin is deposited on the acoustic complex, itself previously formed on the first skin, for example by additive manufacturing.

In some embodiments, the acoustic complex is manufactured using a material compatible with the first and second skins, preferably using the same thermoplastic material as the first and second skins.

In some embodiments, the acoustic complex comprises a reinforced thermoplastic material. The thermoplastic material may for example comprise a thermoplastic matrix and carbon fiber fillers, allowing to reinforce the mechanical strength of the acoustic panel.

BRIEF DESCRIPTION OF THE DRAWINGS

The invention and its advantages will be better understood upon reading the detailed description given below of different embodiments of the invention given as non-limiting examples. This description refers to the appended pages of figures, in which:

FIG. 1 shows a sectional view of a turbojet engine comprising an acoustic panel comprising a skin according to one embodiment of the invention, in a longitudinal plane of the turbojet engine, FIG. 2 shows a partial perspective view of an acoustic panel comprising a skin according to one embodiment of the invention, FIG. 3 schematically shows a depositing tool moving on a lay-up tooling in a manufacturing method according to one embodiment of the invention, FIG. 4 schematically shows a bottom view of a set of cells of a lay-up tooling used in a method for the manufacture of a skin according to one embodiment of the invention, FIG. 5 schematically shows the different steps of a method for manufacturing an acoustic panel,

DESCRIPTION OF THE EMBODIMENTS

FIG. 1 shows a sectional view of a turbojet engine 1 according to an embodiment of the invention, in a longitudinal plane of the turbojet engine 1. The turbojet engine 1 comprises a nacelle 2, an intermediate casing 3 and an inner casing 4. The nacelle 2 and the two casings 3 and 4 are coaxial. The nacelle 2 defines at a first end an inlet channel 6 for a fluid flow and at a second end, opposite the first end, an exhaust channel 6 for a fluid flow. The nacelle 2 and the intermediate casing 3 delimit therebetween a primary fluid flow path 7. The intermediate casing 3 and the inner casing 4 delimit therebetween a secondary fluid flow path 8. The primary flow path 7 and the secondary flow path 8 are disposed in an axial direction of the turbojet engine between the inlet channel 5 and the exhaust channel 6.

The turbojet engine 1 further comprises a fan 9 configured to deliver an air flow F as a fluid flow, the air flow F being divided at the outlet of the fan into a primary flow Fp flowing in the primary flow path 7 and into a secondary flow Fs flowing in the secondary flow path 8. The turbojet engine 1 further comprises at least one acoustic panel 10 configured to attenuate the acoustic waves emitted by the turbojet engine before these waves escape radially to the outside of the nacelle 2 of the turbojet engine 1. The acoustic panel 10 is configured to attenuate acoustic waves whose frequency belongs to a predetermined frequency range. In the embodiment illustrated in FIG. 1, the panel 10 is integrated into the intermediate casing 3 and the inner casing 4. Although they are not shown, other acoustic panels may be integrated into the nacelle 2 and the inner casing 4 in particular.

The remainder of the description describes an example in which a skin, manufactured by a method in accordance with the invention, is used in the acoustic panel 10. It will be noted, however, that this example is not limiting, the skin being able to be used for other parts of the turbojet engine 1, in particular the intermediate casing 3, the internal casing 4 or the nacelle 2, without necessarily being part of an acoustic panel.

FIG. 2 shows a partial perspective view of an acoustic panel 10 comprising an external skin (hereinafter referred to as the first skin) obtained by a method according to an embodiment of the invention. In a known manner, the acoustic panels 10 are Helmholtz resonators. Typically, an acoustic panel 10 such as that illustrated in FIG. 2 comprises a honeycomb structure stage. The acoustic panel 10 comprises in particular a first perforated skin 12, a second solid skin 14, and an acoustic complex 16, which is a core with a honeycomb structure sandwiched between these skins. The acoustic complex 16 consists of an array of cells 18 in the shape of a honeycomb. It will be noted that this honeycomb structure is not limiting, other types of structure, that can be manufactured by additive manufacturing as described below, may be applicable without departing from the scope of the invention. As for the first perforated skin 12, it is attached to the acoustic complex 16 and is disposed, within the context of the invention, on the side of the primary flow path 7 of the turbojet engine 1. This skin is perforated by a plurality of orifices 20, each orifice 20 opening onto a cell 18 of the acoustic complex 16, several orifices 20 being able to open onto the same cell 18.

A method for the manufacture of a skin according to an embodiment in accordance with the present disclosure, used in the context of the manufacture of such an acoustic panel 10, will then be described with reference to FIGS. 3 to 5.

Firstly, the first skin 12 is manufactured by automatic laying (step S100), in particular, but without limitation, the "AFP" (for "automated fiber placement") or "ATL" (for "automated tape layer") technique known per se, by successive deposition of wicks, or pre-impregnated ("prepreg") strips parallel to each other and on several layers, called "plies". The deposited strips comprise a thermoplastic material TP (more simply called "material TP" in the remainder of the description), in particular, but without limitation, a polyetheretherketone PEEK, a polyetherketoneketone PEKK, a polyaryletherketone PAEK or a polyphenylsulfone PPSU.

These strips of material TP are deposited by a depositing tool 100, on a lay-up tooling 200, shown schematically in FIG. 3. The depositing tool 100 comprises a depositing head 110, supplied with material TP in the form of a strip, by a feed device (not shown). A cutting module 120 allows to cut the strip of material TP when the latter has reached the desired length.

A compacting roller 130 allows to apply the strip of material TP onto a surface S of the lay-up tooling 200 described below, by exerting a pressure on this strip while it is being laid. More specifically, during laying, the depositing tool 100 moves in the direction D represented by an arrow in FIG. 3. The direction of displacement of the depositing tool 100, in the direction D, defines, according to the present disclosure, an upstream-downstream direction, corresponding to a right-left direction in FIG. 3. Thus, the region to the right of the compacting roller 130 in FIG. 3, more precisely to the right of a lay-up surface P, which is the contact surface between the compacting roller 130 and the surface S (the lay-up surface P itself moving when the depositing tool 100 moves in the direction D), corresponds to an upstream region in which the material TP has already been deposited, while the region to the left of the lay-up surface P in this figure corresponds to a downstream region in which the material TP will be deposited. Thus, during its movement, the compacting roller 130 rolls downstream on the surface S, sandwiching the strip of material TP being deposited between the compacting roller 130 and the surface S.

Furthermore, a heat source, in particular a laser 140 preferably directed towards the compacting roller 130 and onto the material TP, allows to heat, in the downstream region, the strip of material TP being deposited. The compacting roller 130 and the laser 140 allow to provide the pressure and heat necessary for the adhesion of the strips of material TP to each other, in particular of the last ply deposited and the one currently being deposited. In particular, the laser 140 can heat the material TP to temperatures comprised between 100° C. and 500° C., to allow the adhesion of the strips to each other, and the compacting roller 130 can exert compacting forces comprised between 200 N and 500 N, and up to 1200 N for "in-situ" configurations.

The lay-up tooling 200 comprises a lower portion 210 and an upper portion 220. The upper surface of the upper portion 220 is the surface S on which the material TP is deposited by laying during the manufacture of the first skin 12. This surface S has a curvature, shown for illustration purposes in FIG. 3, but generally corresponding to the final shape of the acoustic panel 10 intended to be manufactured. For example, if the acoustic panel to be manufactured has an annular shape, the surface S will have an equivalent shape, in an arc of a circle.

The volume formed by the upper portion 220 is divided into a plurality of cells 222 (or chambers, or compartments) independent of each other. In order to facilitate the description, only four cells 222 are shown in FIG. 3, their dimensions, in particular their width, being deliberately exaggerated. In reality, the lay-up tooling 200 comprises in its upper portion 220 a large number of cells 222, of width less than that illustrated in this figure.

In this regard, FIG. 4 schematically represents an example of distribution and shape of the cells 222, in a view perpendicular to the surface S (for example a bottom view). These cells 222, of triangular section, are disposed so as to form an array under the surface S. The dotted square represents the material TP of at least a portion of the first skin 12 deposited on the surface S, that is to say just above the cells 222. It is thus possible to locally heat, in a targeted manner, small areas of the surface S, and therefore small areas of the material TP deposited on the surface S, by heating each cell 222 individually, so as to modulate the heat supply.

For this purpose, the lay-up tooling 200 comprises a thermal regulation device configured to heat each cell 222 individually. The thermal regulation device comprises a compressed air supply unit 230 configured to individually supply, via a compressed air supply channel 232, a plurality of conduits 234 each communicating individually with one of the cells 222. In addition, each conduit 234 is equipped with a heating element 236, for example a heating resistor, allowing to heat the air flowing in the conduit 234 before it is injected into the cell 222.

The thermal regulation device also comprises a control unit 240, configured to control the compressed air supply unit 230, and to individually control each heating element 236. Thus, the control unit is configured to control the conduits 234, and consequently the cells 222 to be supplied with compressed air, while regulating the temperature of the heating elements 236, individually, so as to control the temperature of the pulsed air thus injected into each cell 222.

Moreover, although this connection is not illustrated, the control unit 240 can also be connected to the depositing tool 100, so as to be able to synchronize the heating of the cells 222 with the movement of the depositing tool 100 when laying the first skin 12 during step S100. More precisely, by detecting the position of the depositing tool 100 at a given time during its movement, and in particular the position of the lay-up surface P, the control unit can supply the cells 222 disposed upstream of the lay-up surface P, so as to target the areas of the surface S where the material TP has just been deposited, and thus control the cooling of the latter. The control unit can also supply the cells 222 disposed downstream of the lay-up surface P, so as to target the areas of the surface S where the material TP will be deposited, and thus control the temperature rise of the latter, in order to limit the temperature gradient induced by the laser 140.

It can thus, by means of the heating elements 236, regulate the temperature of the air supplying said cells 222, and the speed of the heating or cooling ramps, depending on the desired final state of the material (crystallinity level), and also depending on the number of plies deposited, and therefore the thickness of the first skin 12 during manufacture. Indeed, when N strips of material TP were superimposed on each other, strip N+1, deposited on strip N, will be separated from the surface S by said N strips. Given the insulating nature of the material TP, it may be necessary to adapt the local temperature and heating speed of the cells 222, in order to obtain an equivalent crystallinity level for each ply. For example, the control unit 240 can locally regulate the temperature of the surface S by local heating gradients comprised between 30° C./min and 100° C./min.

In general, the control unit 240 can be configured to individually control the heating of each cell 222 according to the position of the depositing tool 100, its movement speed, the heating temperature of the laser 140, and the number of plies deposited on the surface S. For example, when the laser 140 heats the strip of material TP being laid to a temperature T1 downstream of the lay-up surface P, the control unit 240 can control the heating elements 236 so that the cells 222 located upstream of the lay-up surface P are heated to a temperature T2 lower than T1, so as to control the temperature gradient $\Delta T$, where $\Delta T = T1 - T2$, taking into account parameters such as the number of plies present at this position and at this time, the trajectory or the movement speed of the depositing tool 100.

In the example described above, the thermal regulation device uses a pulsed air system to individually heat the cells 222. It will be noted that this example is not limiting, other means such as induction or a heat transfer fluid can be used.

Step S100 of manufacturing the first skin 12 is completed when all the plies allowing to obtain the desired shape and thickness of the skin have been deposited on the surface S of the lay-up tooling 200, while locally heating this surface S in the manner described above.

Then, the acoustic complex 16 is manufactured directly on the first skin 12, by additive manufacturing (step S200), by means of a tool provided for this purpose. The acoustic complex 16 is preferably manufactured from the same thermoplastic material as the first skin 12, and can further be filled with carbon fibers, allowing to reinforce it.

The second skin 14 is then deposited on the face of the acoustic complex 16 opposite the face on which the first skin 12 is attached (step S300), so that the first and second skins are substantially parallel to each other. The second skin 14 is also made of the same material TP as the first skin 12, by automated laying, using the same depositing tool 100. However, unlike the first skin 12, the strips of material TP of the second skin 14 are heated only by the laser 140, and pressed by the compacting roller 130, so as to adhere the strips to each other. It will be noted that the pressure applied to this second skin 14 is compatible with the rigidity of the acoustic complex 16. The thermal regulation device of the lay-up tooling 200 described above is not used, the second skin 14 being deposited on the acoustic complex 16, and not on the surface S of the lay-up tooling 200. It will nevertheless be noted that the control of the crystallinity of the second skin 14 is less critical than for the first skin 12, the latter being in contact with the primary flow Fp and fulfilling the acoustic function.

Although the present invention has been described with reference to specific exemplary embodiments, it is obvious that modifications and changes may be made to these examples without departing from the general scope of the invention as defined by the claims. In particular, individual features of the various illustrated/mentioned embodiments may be combined in additional embodiments. Accordingly, the description and drawings are to be considered in an illustrative rather than restrictive sense.

It is also obvious that all the features described with reference to a method are transposable, alone or in combination, to a device, and conversely, all the features described with reference to a device are transposable, alone or in combination, to a method.

The invention claimed is:

1. A method for the manufacture of at least one skin, in particular of an acoustic panel for an aeronautical engine, comprising the laying of a thermoplastic material on a surface of a lay-up tooling, via a depositing tool configured to exert a pressure on the thermoplastic material and to heat the latter while it is being laid, wherein the lay-up tooling comprises a thermal regulation device configured to locally heat the surface of the lay-up tooling, the thermal regulation device comprising a control unit configured to synchronize the local heating of the surface of the lay-up tooling with the movement of the depositing tool, wherein, during the manufacture of the skin, the depositing tool deposits successive prepreg reinforcement strips of the thermoplastic material, by means of a compacting roller exerting a pressure on the thermoplastic material while it is being laid.

2. The method according to claim 1, wherein the lay-up tooling comprises a plurality of cells disposed under the surface of said lay-up tooling on which the skin is manufactured, the thermal regulation device being configured to heat each cell individually.

3. The method according to claim 1, wherein the local heating of the surface of the lay-up tooling is carried out by induction, via a heat transfer fluid or via pulsed air.

4. The method according to claim 3, wherein the local heating of the surface of the lay-up tooling is carried out by pulsed air, each cell being supplied with pulsed air via a conduit, each conduit being equipped with a heating element individually controlled by the thermal regulation device.

5. The method according to claim 1, wherein, a deposition surface being defined as the contact surface between the depositing tool and the surface of the lay-up tooling, the depositing tool being configured to heat the surface of the lay-up tooling to a first temperature downstream of the deposition surface, and the thermal regulation device being configured to locally heat the surface of the lay-up tooling upstream of the deposition surface to a second temperature lower than the first temperature, an upstream-downstream direction being defined relative to the direction of movement of the depositing tool relative to the surface of the lay-up tooling.

6. The method according to claim 1, wherein the thermal regulation device is configured to locally regulate the temperature of the surface of the lay-up tooling by local heating gradients comprised between 30° C./min and 100° C./min.

7. The method according to claim 1, wherein the thermoplastic material is a polyetheretherketone, a polyetherketoneketone or a polyaryletherketone.

8. The method according to claim 1, wherein the depositing tool heats the thermoplastic material during laying using a laser.

9. A method for the manufacture of an acoustic panel for an aeronautical engine, comprising:

manufacturing a first skin by a method according to claim 1, manufacturing an acoustic complex comprising a plurality of cells, on the first skin, and manufacturing a second skin by laying the thermoplastic material on the acoustic complex, by means of the depositing tool.

* * * * *